United States Patent Office 3,293,199
Patented Dec. 20, 1966

3,293,199
PROCESS FOR THE POLYMERISATION OF
VINYL CHLORIDE
Malcolm James Abercrombie, Dinas Powis, Glamorgan,
Wales, assignor to British Geon Limited, London, England, a British company
No Drawing. Filed July 31, 1963, Ser. No. 299,109
Claims priority, application Great Britain, Aug. 30, 1962,
33,339/62
6 Claims. (Cl. 260—17)

The present invention relates to the production of vinyl chloride polymers and copolymers of vinyl chloride with other monomers. In particular it relates to the production of such polymers by the well known suspension polymerisation process.

By the term "suspension polymerisation process" is meant a process in which a monomer is polymerised in an aqueous medium in the presence of a suspending agent to form polymer particles which separate out on standing. Some examples of compounds commonly used as suspending agents are methyl cellulose, ethyl cellulose, sodium carboxymethyl cellulose, polyvinyl alcohol, gelatin and sorbitan. Polymers produced by this process in which said suspending agents are used show defects known as "fish eyes" or "bits" when the polymer is compounded and extruded or calendered.

Processes for the production of polymers and copolymers of vinyl chloride by suspension polymerising the monomer or monomers in the presence of methyl cellulose and an unsaturated aliphatic alcohol as suspending agents are known in the art. Surprisingly we have now found that the rate of polymerisation of this type of system is considerably faster if the unsaturated aliphatic alcohol is replaced by a high molecular weight saturated aliphatic alcohol.

It is an object of the present invention to provide an improved suspension polymerisation process.

Accordingly the present invention is a process for the production of vinyl chloride polymers or copolymers of vinyl chloride with other monomers which comprises polymerising an aqueous suspension of vinyl chloride, or a mixture of vinyl chloride with other copolymerisable monomers under the influence of an oil soluble initiator in the presence of a substituted cellulose compound and a high molecular weight saturated aliphatic alcohol as hereinafter defined.

Suitable oil soluble initiators include, for example, organic peroxides, such as benzoyl, succinyl, caproyl, diethyl and di-tertiary butyl and azo compounds having molecules containing the group

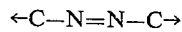

in which the two carbon atoms are non aromatic in character e.g. αα' azo di-isobutyronitrile, αα'azo-bis(α dimethylvaleronitrile) and di-methyl αα'azo-di-isobutyrate. The preferred initiators are lauroyl and caprylyl peroxides.

Any substituted cellulose compound used as a suspending agent in the suspension polymerisation process for the production of vinyl chloride polymers and copolymers is suitable for use in the present invention. The preferred compound is methyl cellulose. Different types and grades of substituted cellulose compounds give rise to polymers with varied specific properties such as for example powder mix properties. In particular, high molecular weight methyl substituted cellulose compounds give polymers with a lower porosity than polymers resulting from the use of low molecular weight methyl substituted cellulose compounds. Methyl substituted cellulose compounds having viscosities in the range 10 to 4000 centipoise are particularly suitable.

By a high molecular weight saturated aliphatic alcohol is meant throughout this specification a saturated aliphatic alcohol having at least 12 carbon atoms in the molecules. The preferred alcohol is stearyl alcohol.

Examples of monomers which may be copolymerised with vinyl chloride by the process of this invention include vinyl acetate, vinyl propionate, vinyl butyrate, chloride, acrylonitrile, ethyl acrylate and methyl methacrylate. It is preferred that vinyl chloride shall form the major proportion by weight of the monomer mixture to be polymerised.

The process can suitably be carried out at a temperature in the range 40 to 75° C. The preferred temperature range is 45 to 60° C. The monomeric material during its polymerisation is preferably maintained in suspension in the aqueous phase by means of a stirrer.

A suitable proportion by weight for the oil soluble initiator based on the weight of monomer present in the initial mixture is in the range 0.01 to 0.15%. The proportion for the cellulose compound is in the range 0.01 to 0.3%. The high molecular weight aliphatic alcohol is suitably present in a proportion in the range 0.05 to 1.0%. The proportions of oil soluble initiator, suspensing agent and aliphatic alcohol employed in any particular embodiment of the process of the present invention is dependent upon such factors as the degree of agitation of the reaction mixture, the temperature of polymerisation and the size of polymer particle it is desired to produce.

Vinyl chloride polymers and copolymers of vinyl chloride with other monomer produced according to the process of the present invention when compounded and extruded or calendered have fewer "fish eyes" or "bits" than similar polymers or copolymers produced by known suspension polymerisation processes. They are easy to process when compounded with plasticizer, lubricant and stabilisers, and have good electrical properties.

The process according to the present invention is further illustrated by the following example.

*Example 1*

An autoclave provided with a stirrer was charged with 100 parts by weight of vinyl chloride, 0.07 parts of low molecular weight methyl cellulose (a 2% solution having a viscosity of 20 centipoise) 0.12 parts by weight of stearyl alcohol, 0.0625 parts by weight of caprylyl peroxide and 151 parts by weight of demineralised water. The mixture was stirred at room temperature to form a suspension and the polymerisation was carried out at 56° C. The reaction took about 16 hours. The final product was very uniform, fine grained and had a K-value of 67. From the product so obtained a plug, compounded from 80 parts by weight of polymer, 20 parts by weight plasticizer, 0.4 parts by weight blue dye, and 1.0 parts by weight of stabiliser in the Brabender Plastograph, was obtained and pressed out into a thin sheet (10 thou.). The "fish eyes" appeared as white particles against the blue background. The number per square inch were counted. the polymer prepared by the above method had a count of 2–4 "fish eyes" per square inch.

By way of comparison the polymer produced from an identical formulation except that the methyl cellulose and stearyl alcohol were replaced by polyvinyl alcohol and/or gelatin had a "fish eye" count of 15–18 "fish eyes" per square inch.

*Example 2*

An autoclave provided with a stirrer was charged with 100 parts by weight of vinyl chloride, 0.20 parts of low molecular weight methyl cellulose (a 2% solution having a viscosity of 20 centipoise), 0.5 part stearyl alcohol, 0.15 part by weight of caprylyl peroxide and 175.0 parts by weight of demineralised water. The polymerisation was carried out at 50° C. and the reaction took 20 hours.

By way of comparison the above process was repeated except that the 0.5 part of stearyl alcohol was replaced by 0.5 part oleyl alcohol. The polymerisation took 39½ hours.

I claim:
1. A process for the production of vinyl chloride polymers and copolymers of vinyl chloride with other monomers which comprises mixing vinyl chloride or vinyl chloride together with other copolymerisable monomers with an oil soluble polymerisation initiator, a substituted cellulose compound and stearyl alcohol to form an aqueous suspension, polymerising the suspension and recovering the formed polymers or copolymers.

2. A process according to claim 1 wherein the substituted cellulose compound is methyl cellulose having a viscosity in the range 10 to 4000 centipoise.

3. A process according to claim 1 wherein the oil soluble polymerization initiator is present in the amount of 0.01 to 0.15% based on the weight of the monomer present in the initial mixture.

4. A process according to claim 3 wherein the substituted cellulose compound is present in the amount of 0.01 to 0.3% based on the weight of the monomer present in the initial mixture.

5. A process according to claim 4 wherein the stearyl alcohol is present in the amount of 0.05 to 1.0% based on the weight of the monomer present in the initial mixture.

6. A process for the production of vinyl chloride polymers and copolymers of vinyl chloride with other monomers which comprises mixing vinyl chloride or vinyl chloride together with other copolymerisable monomers with 0.01 to 0.15% of an oil soluble polymerisation initiator, 0.01 to 0.3% of methyl cellulose and 0.05 to 1.0% of stearyl alcohol to form an aqueous suspension, all percentages being based on the weight of the monomer present in the initial mixture, polymerising the suspension and recovering the formed polymers or copolymers.

References Cited by the Examiner
UNITED STATES PATENTS

| 3,029,229 | 4/1962 | Doell | 260—92.8 |
| 3,042,665 | 7/1962 | Jankowiak et al. | 260—92.7 |

OTHER REFERENCES

Reinhold: "Consensed Chemical Dictionary," 5th edition, 1956, pp. 1031.

SAMUEL H. BLECH, *Primary Examiner.*

J. NORRIS, *Assistant Examiner.*